US 6,707,964 B2

(12) United States Patent
Dimas et al.

(10) Patent No.: US 6,707,964 B2
(45) Date of Patent: Mar. 16, 2004

(54) RADIATION POWER DEMULTIPLEXER

(75) Inventors: Chris F. Dimas, North York (CA); John J. Kuta, Mississauga (CA); Steve Read, Mississauga (CA)

(73) Assignee: EXFO Photonic Solutions Inc., Mississauga (CA)

( * ) Notice: Subject to any disclaimer, the term of this patent is extended or adjusted under 35 U.S.C. 154(b) by 0 days.

(21) Appl. No.: 10/147,812

(22) Filed: May 20, 2002

(65) Prior Publication Data

US 2003/0215180 A1 Nov. 20, 2003

(51) Int. Cl.[7] .................................................. G02B 6/26
(52) U.S. Cl. .......................................... 385/31; 385/147
(58) Field of Search ......................... 385/24, 147, 12.5, 385/31, 39, 141

(56) References Cited

U.S. PATENT DOCUMENTS

| 4,932,747 | A |   | 6/1990  | Russell et al. |
|-----------|---|---|---------|----------------|
| 5,413,234 | A | * | 5/1995  | Hekal et al. ............... 215/230 |
| 5,440,423 | A |   | 8/1995  | Ogura |
| 5,470,892 | A | * | 11/1995 | Gupta et al. ................... 522/42 |
| 5,581,978 | A | * | 12/1996 | Hekal et al. ................... 53/411 |
| 5,610,733 | A |   | 3/1997  | Feldman et al. |
| 5,625,738 | A |   | 4/1997  | Magarill |
| 5,838,865 | A |   | 11/1998 | Gulick |
| 6,055,346 | A |   | 4/2000  | Godard et al. |
| 6,544,334 | B1 | * | 4/2003 | Potyrailo et al. ............. 118/58 |
| 2003/0077390 | A1 | * | 4/2003 | Potyrailo et al. ........ 427/372.2 |
| 2003/0077399 | A1 | * | 4/2003 | Potyrailo et al. ........... 427/532 |

OTHER PUBLICATIONS

Cassarly et al., Distributed Lighting Systems: Uniform Light Delivery, 1995, Optical Research Associates, Pasadena, California, United States of America, no date.

* cited by examiner

Primary Examiner—Akm Enayet Ullah
(74) Attorney, Agent, or Firm—Bereskin & Parr

(57) ABSTRACT

A curing system, a transmission system and a method for delivering curing radiation to multiple worksites simultaneously. The curing system includes a radiation source adapted to generate curing radiation, a homogenizer adapted to receive radiation generated by the radiation source and emit substantially homogenized radiation, and a radiation transmission device. The radiation transmission device includes at least one device inlet port adapted to receive substantially homogenized radiation from the homogenizer and a plurality of transmission channels operatively coupled to the device inlet port and adapted to transmit radiation received by the device inlet port. Each transmission channel comprises a device outlet port adapted to emit radiation transmitted by the transmission channel.

29 Claims, 5 Drawing Sheets

US 6,707,964 B2

RADIATION POWER DEMULTIPLEXER

FIELD OF THE INVENTION

The present invention relates generally to the field of curing polymeric materials, typically in the class of light activated thermosets. For greater clarity, when used herein, reference to "curable" and "reactive" materials and variations thereof are intended to mean polymeric materials that chemically transform with the application of sufficient energy, unless a contrary intention is apparent.

BACKGROUND OF THE INVENTION

Multi-legged light guides enable a single radiation source to provide multiple worksites with curing radiation simultaneously. However, there currently does not exist an efficient method for dividing or demultiplexing the radiation from a single non-uniform radiation source and delivering it to multiple locations in known proportions. For greater clarity, when used herein, reference to "demultiplexing" radiation and variations thereof are intended to mean the division of the radiation power, rather than the separation of different wavelengths of radiation.

Accordingly, the inventor has recognized a need for an efficient apparatus and method for demultiplexing curing radiation.

SUMMARY OF THE INVENTION

This invention is directed towards a curing system for providing curing radiation to multiple worksites simultaneously.

The curing system includes a radiation source adapted to generate curing radiation, a homogenizer adapted to receive radiation generated by the radiation source and emit substantially homogenized radiation, and a radiation transmission device. The radiation transmission device includes at least one device inlet port adapted to receive substantially homogenized radiation from the homogenizer and a plurality of transmission channels operatively coupled to the device inlet port and adapted to transmit radiation received by the device inlet port. Each transmission channel comprises a device outlet port adapted to emit radiation transmitted by the transmission channel.

The present invention is also directed towards a radiation transmission system for transmitting curing radiation to multiple worksites simultaneously. The transmission system includes a homogenizer adapted to receive radiation generated by a radiation source and emit substantially homogenized radiation, and a radiation transmission device. The radiation transmission device includes at least one device inlet port adapted to receive substantially homogenized radiation from the homogenizer and a plurality of device outlet ports.

The present invention is further directed towards a method for curing reactive material at multiple worksites simultaneously. The method includes the steps of:
 a) generating radiation within the absorption spectrum of the reactive material;
 b) substantially homogenizing the radiation;
 c) directing the substantially homogenized radiation into an inlet port of a multi-legged transmission device;
 d) emitting radiation from a plurality of legs of the transmission device; and
 e) directing the emitted radiation onto the reactive material until the reactive material is sufficiently cured.

BRIEF DESCRIPTION OF THE DRAWINGS

The present invention will now be described, by way of example only, with reference to the following drawings, in which like reference numerals refer to like parts and in which.

DETAILED DESCRIPTION OF THE INVENTION

Figure 1:
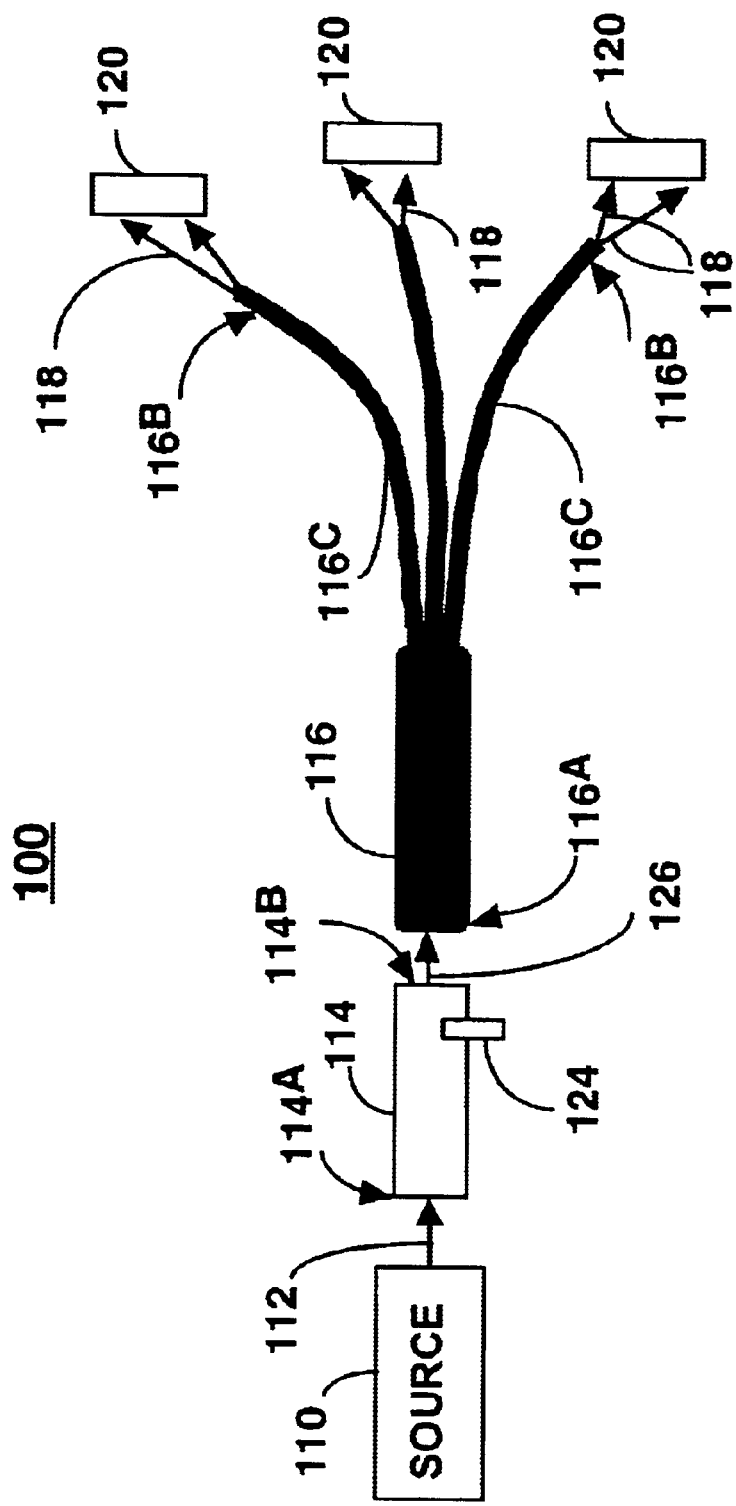
FIG. 1 is a schematic diagram of a curing system made in accordance with the present invention.
Figure 4B:
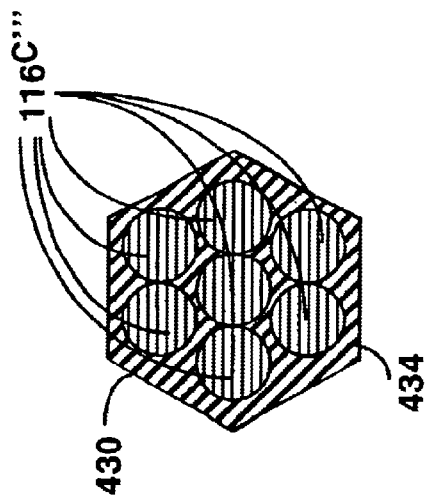
FIG. 4B is a diagram illustrating an efficient cross-sectional shape of a regular hexagon for a homogenizer to be used with a configuration of seven circular light guide channels.
Figure 3B:
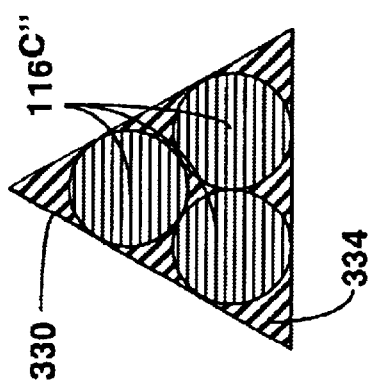
FIG. 3B is a diagram illustrating an efficient cross-sectional shape of a regular triangle for a curing radiation homogenizer to be used with triangular configuration of three circular light guide channels.

Illustrated in FIG. 1 is a first embodiment of a curing system of the subject invention. The system, shown generally as 100, includes a radiation source 110 capable of generating curing radiation illustrated as vector 112, a homogenizer 114, and a radiation transmission device 116.

The radiation source 110 may include an ellipsoidal reflector with a discharge lamp positioned at one focal point, and the inlet port $114^A$ of the homogenizer 114 positioned at the reflector's second focal point. Preferably the cross-sectional area of the focused radiation beam at the focal plane is designed to maximize the power received by the homogenizer's 114 inlet port $114^A$. A discharge lamp with an ellipsoidal reflector is fairly common in the curing industry, although it should be understood that other suitable radiation sources might be used.

As will be discussed in greater detail below, the homogenizer 114 is adapted to receive non-uniform radiation generated by the source 110 via its inlet port $114^A$, and emit substantially homogenized radiation from its outlet port $114^B$.

The transmission device 116 will typically be a standard waveguide, often fiber optic cabling or a liquid light guide having multiple outlet ports $116^B$ such as a multi-legged liquid light guide, for simultaneously directing radiation (illustrated by vectors 118) to multiple worksites having workpieces 120 containing reactive material to be cured. Typically the system 100 will be configured such that each outlet port 116$^B$ emits substantially the identical power level of radiation to its respective worksite as every other outlet port 116$^B$. The inlet port 116$^A$ of the transmission device 116 is positioned and sized to receive the substantially homogenized radiation emitted from the homogenizer 114. The channels or legs 116$^C$ of the transmission device 116 transmit the radiation received via the inlet port 116$^A$ to the corresponding outlet ports 116$^B$.

One of the advantages provided by utilizing a homogenizer 114 in a curing system 100 having a fiber optic transmission device 116 is that the homogenizer 114 reduces or eliminates "hot spots" or regions of high power radiation which damage the fiber cabling and cladding. As a result, higher overall power levels of radiation may be transmitted through fiber optic transmission devices 116, while keeping the peak irradiance below levels that would damage the fiber cabling and cladding. The reduced heat load is also advantageous for curing systems 100 having a liquid light guide transmission device 116.

Figure 2B:
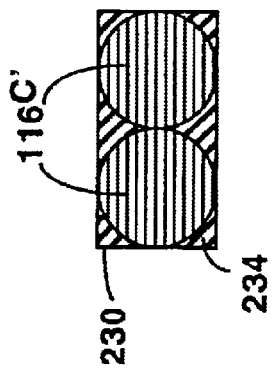
FIG. 2B is a diagram illustrating an efficient cross-sectional shape of a rectangle for a curing radiation homogenizer to be used with two circular light guide channels.
Figure 2A:
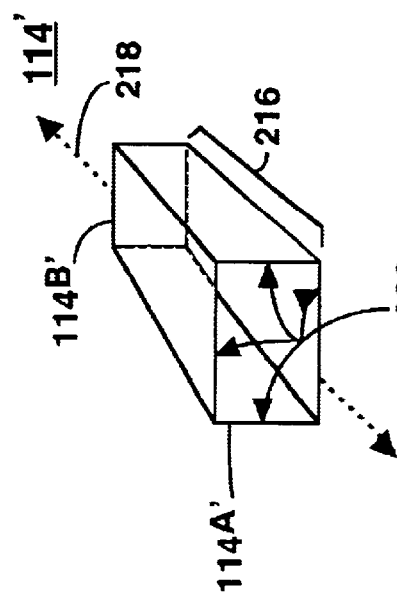
FIG. 2A is a front perspective view of a curing radiation homogenizer made in accordance with the present invention and having a regular rectangular shape in cross-section.

Illustrated in FIG. 2A is a first embodiment of a homogenizer 114' which may be used in the curing system 100 of FIG. 1. The homogenizer 114' includes an inlet port 114$^{A'}$, an outlet port 114$^{B'}$ and a passageway 216 interconnecting the inlet port 114$^{A'}$, to the outlet port 114$^{B'}$.

The passageway 216 extends along its longitudinal axis 218. The interior sidewalls 220 of the passageway 216 are selected to internally reflect curing radiation (typically in a particular bandpass within the wavelength range of 0.2 to 10 micrometers). The inlet port 114$^{A'}$ and the outlet port 114$^{B'}$ are configured to receive and emit radiation, respectively.

The cross-sectional shape of the passageway 216 is a rectangle. For greater clarity, when used herein, reference to "cross-section" and variations thereof is intended to mean a cross-section taken perpendicular to the longitudinal axis, unless a contrary intention is apparent. A rectangle is tileable since rectangles of the same size may be positioned on a plane with edges abutting, and leaving no gaps. A passageway 216 preferably has a cross-sectional shape that is tileable since such a configuration generally homogenizes radiation more efficiently than one having an untileable cross-sectional shape. In other words, a homogenized plane of irradiance is obtained for shorter lengths of the passageway 216.

As noted previously, the homogenizer 114, 114' will typically be used in association with a multi-legged liquid light guide 116 or a multi-legged fiber optic bundle to simultaneously transmit radiation to multiple workpieces 120 to be cured. Accordingly, it is preferable if the cross-sectional shape of the passageway 216 is selected to optimize the coupling efficiency between the homogenizer outlet port 114$^{B'}$ and the inlet port 116$^A$ of the transmission device 116, while ensuring that the inlet port 116$^A$ (and particularly the channels 116$^C$) is receiving radiation over a desired cross-sectional area as will be discussed in greater detail below.

FIG. 2B illustrates the ability of the rectangular cross-sectional shape of the homogenizer 114' to efficiently communicate or transfer radiation to a bifurcated (2-legged) liquid light guide. As can be seen, a passageway 216 having a cross-sectional shape in the form of a rectangle 230 and sized appropriately is able to overlap the cross-sectional area of each of the two circular channels 116$^{C'}$ of a bifurcated light guide. The rectangular passageway 216 is also selected to minimize the cross-sectional area 234 of the passageway 216 (represented by angled hatching) which does not transfer radiation to the channels 116$^{C'}$. As will be understood, while the inlet port 116$^A$ of the transmission device 116 may comprise the ends of a bundle of separate channels 116$^C$ (particularly in the case of liquid light guides) each inlet end of a channel 116$^C$ may be considered to be an inlet port.

Figure 4A:
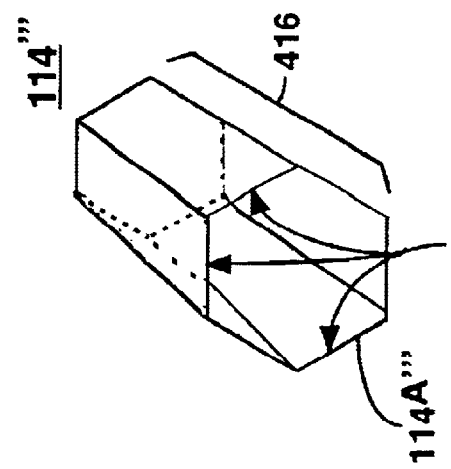
FIG. 4A is front perspective view of a curing radiation homogenizer made in accordance with the present invention and having a regular hexagonal shape in cross-section.
Figure 3A:
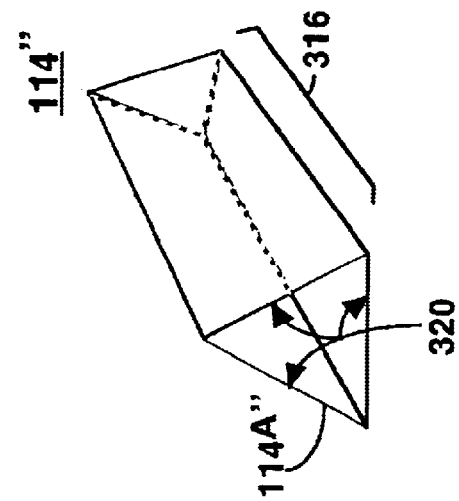
FIG. 3A is a front perspective view of a curing radiation homogenizer made in accordance with the present invention and having a regular triangular shape in cross-section.

Referring now to FIGS. 3A and 4A are additional embodiments of a homogenizer 114. The homogenizers, shown generally as 114'' and 114''', are generally similar to the homogenizer 114' of FIG. 2A, and have cross-sectional shapes of an equilateral triangle 330 and a regular hexagon 430, respectively. These two cross-sectional shapes are shown to minimize the passageway 334, 434 (represented by angled hatching) which does not transfer radiation to the channels 116$^{C''}$, 116$^{C'''}$ of a three-legged and seven-legged light guide, respectively.

The hexagonal cross-sectional shape in particular is an efficient shape for coupling light from the most common light sources 110 since these sources typically produce a circular spot at their focus. Furthermore, it is known that the highest packing fraction of optical fiber is obtained when the fibers are packed in a hexagonal arrangement and therefore improved coupling efficiency to a fiber optic transmission device 116 (in which the inlet port 116$^A$ is in the shape of a hexagon) is also achieved with a hexagonal shaped homogenizer.

Referring now to FIGS. 2A, 3A and 4A as will be understood, the homogenizer 114, 114', 114'', 114''' may be made of a solid material such as quartz, ultraviolet grade fused silica, or other material chosen to have a high optical transmission in the desired spectral region with the interior side walls 220, 320, 420 of the passageways 216, 316, 416 reflecting the curing radiation via total internal reflection. Alternatively, the homogenizer 114, 114', 114'', 114''' may be tubular, with the interior sidewalls 220, 320, 420 of the passageways 216, 316, 416 made of polished aluminum or other reflective material capable of reflecting a high percentage of the curing radiation. Furthermore, it should also be understood that other types of radiation homogenizers may also be used in the curing system 100 in place of the homogenizers 114, 114', 114'', 114''' illustrated herein.

In most applications it is preferred that the sidewalls 220, 320, 420 are planar to provide for mainly specular reflection. Specular reflection of the curing radiation maintains the entendue (angular extent) of the radiation received from the source 110 and thereby maximizes coupling to the transmission device 116. If uniformity in intensity (angular distribution) and/or irradiance homogeneity is desired, the sidewalls 220, 320, 420 may be tapered, or their surfaces may be made diffusive.

The length of the passageway 216, 316, 416 is selected such that non-uniform radiation received through the inlet port 114$^{A'}$, 114$^{A''}$, 114$^{A'''}$ is internally reflected a sufficient number of times to substantially homogenize the radiation. As will be understood there will be certain optimal lengths based on light source characteristics and the cross-sectional shape of the transmission device 116 inlet port(s) 116$^A$. A shorter length of passageway will maximize the power throughput (by minimizing the number of reflections from the walls of the homogenizer 114) as well as minimize the homogenizer's 114 overall size. Typically the passageway 216, 316, 416 length of a homogenizer 114, 114', 114'', 114''' made from a solid material (eg. quartz) will be longer than for a hollow homogenizer 114, 114', 114'', 114'''. As will be understood, since rays of radiation are refracted upon entering a solid material, the radiation will therefore require greater passageway 216, 316, 416 length in order to achieve a similar number of internal reflections as a hollow homogenizer 114, 114', 114", 114'" of equal cross-sectional dimensions.

Referring back to FIG. 1, the homogenizer 114 will also preferably include a power feedback monitor 124. The monitor 124 is configured to sample and measure a portion of substantially homogenized radiation from the homogenizer 114, which is directly correlated to the power of radiation emitted by the homogenizer 114. This sample measurement is also directly correlated to the power delivered to each worksite since each outlet port $116^B$ of the transmission device 116 will transmit a constant proportion of the radiation emitted by the homogenizer 114.

The monitor 124 may include a radiometer positioned proximate a small transparent aperture in a sidewall of the passageway near the homogenizer's 114 outlet port $114^B$. Near the outlet port $114^B$, the radiation is substantially homogenized and therefore the radiation 126 emitted through the aperture will be linearly related to the power output from the outlet port $114^B$. The power monitor 124 will be configured to generate and/or display data correlated to the power of the radiation 126 emitted by the homogenizer 114. As will be understood, the power monitor 124 will also preferably be calibrated to generate data correlated to the power of radiation 118 emitted by one or more outlet ports $116^B$ of the transmission device 116.

Typically, the system 100 will be configured such that each outlet port $116^B$ will emit substantially the same power level of radiation as every other outlet port $116^B$. As will be understood, it is also possible to configure the system 100 such that different outlet ports $116^B$ emit proportionately different power levels of radiation. For example, this may be achieved by adjusting the outlet port $114^B$ of the homogenizer 114 to overlap only a certain portion of the inlet end of a particular channel $116^C$. The overlap ratio for each channel $116^C$ may be used to calculate the power of radiation delivered by each channel $116^C$ to its corresponding worksite.

Figure 5A:
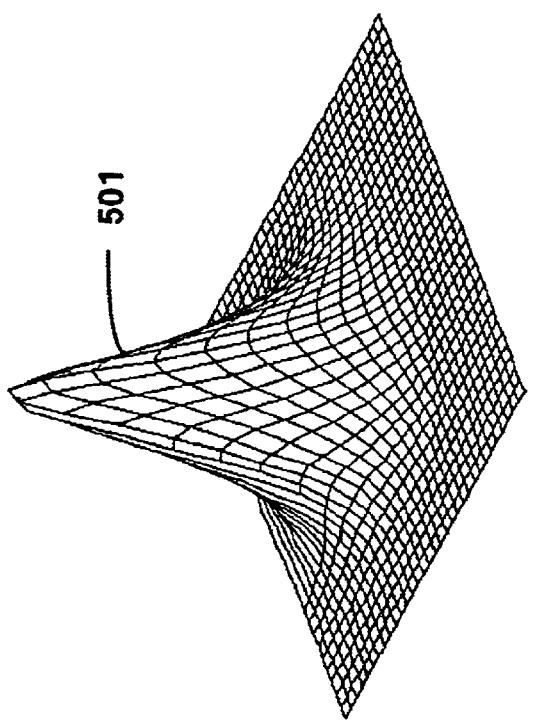
FIG. 5A is a graph illustrating the 3D beam profile of power distribution at the focal point of a typical curing radiation source.

Referring now to FIG. 5A, illustrated therein is a graph illustrating the three-dimensional beam profile 501 of the radiation 112 power distribution taken at the focal point of a radiation source 110, such as a discharge lamp having an ellipsoidal reflector. As can be seen, the profile 501 is non-uniform, having high power levels at the peak corresponding to the center of the radiation beam generated by the source 110, with decreasing power levels moving towards the outer periphery of the radiation beam.

Figure 5B:
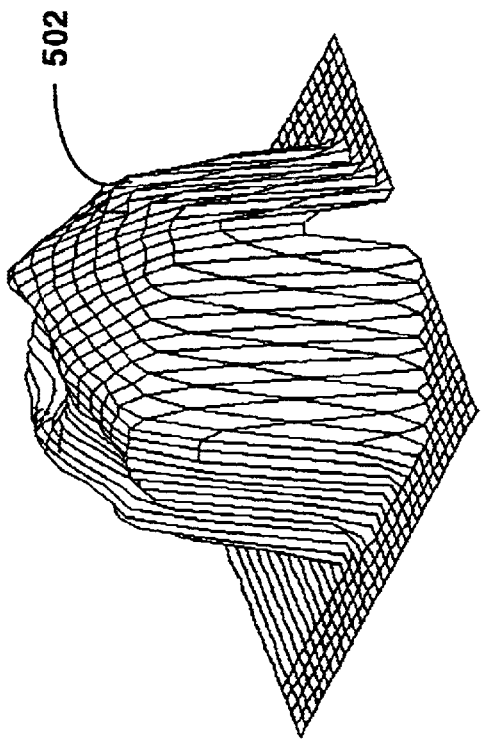
FIG. 5B is a graph illustrating the 3D beam profile of power distribution of substantially homogenized radiation emitted from the homogenizer of FIG. 4A.

The non-uniform beam profile 501 may be contrasted with the three dimensional beam profile 502 of the substantially homogenized radiation 126, illustrated in FIG. 5B. The power distribution represented by the beam profile 502 was taken from the outlet port $114^B$ of a homogenizer 114 having a hexagonal cross-section, similar to the homogenizer 114'" of FIG. 4A, with its inlet port $114^A$ positioned at the focal point of the source 110. The power distribution of the beam profile 502 is substantially homogeneous, particularly when compared to the power distribution of the radiation 112 emitted by the source 110.

Figure 6:
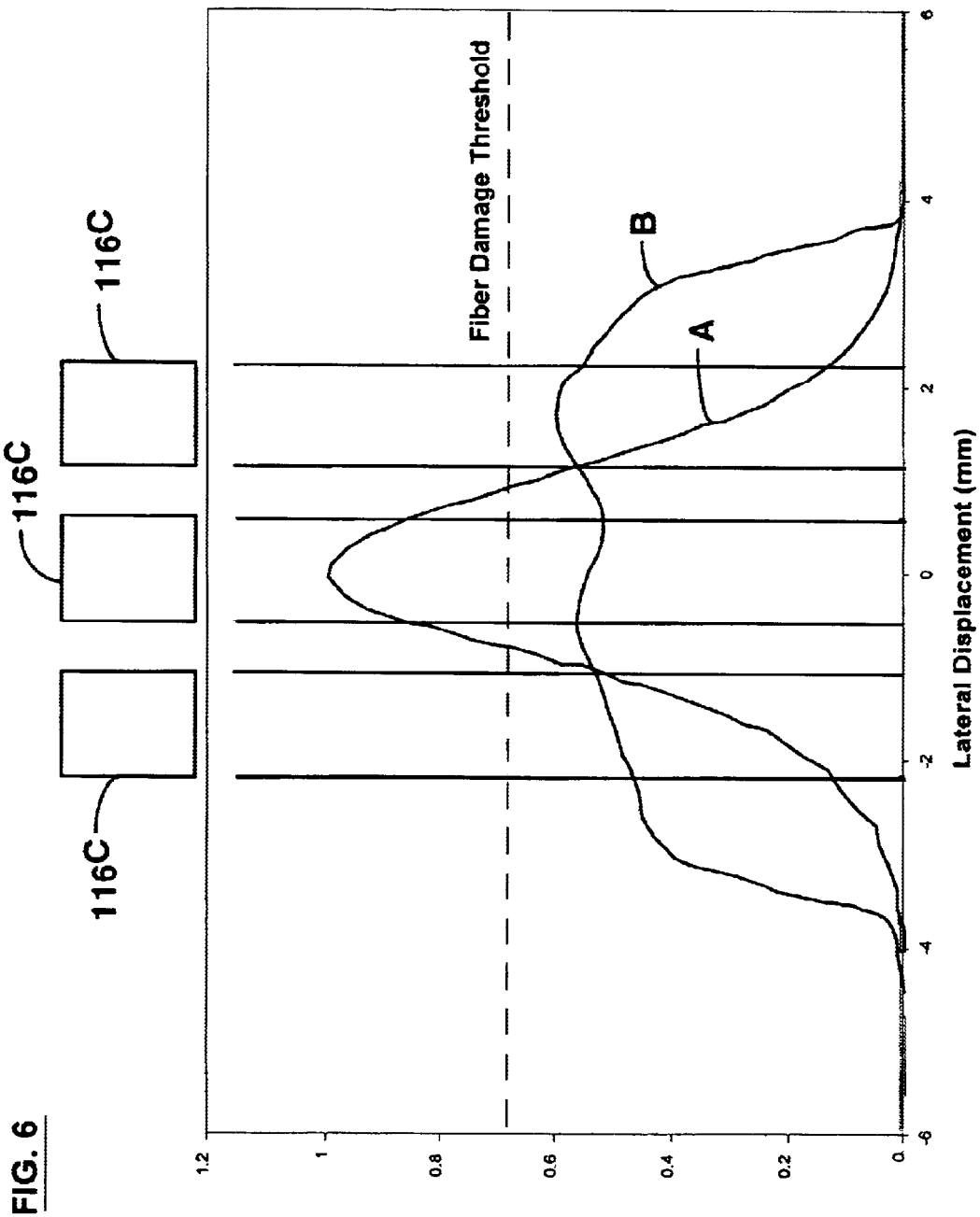
FIG. 6 is a graph comparing a cross-section of the beam profile of FIG. 5A with a cross-section of the beam profile of FIG. 5B.

The homogeneity of the beam profile 502 is further illustrated by the graph of FIG. 6 which depicts a cross-section of the source beam profile 501 (depicted by line A on the graph) with a cross-section of the homogenized beam profile 502 (depicted by line B on the graph). As noted above, the homogenized cross-section B indicates substantially uniform power distribution across its diameter, while the source cross-section A indicates high power levels at the center of the radiation beam with declining power levels towards the periphery of the beam.

Also indicated in FIG. 6 are schematic representations of the cross-sections of three large core diameter fibers or light guides forming the channels $116^C$ of a transmission device 116 when placed at the outlet port $114^B$ of the homogenizer 114. It is clear that these channels $116^C$ will collect similar amounts of radiation from the source 110 only when the homogenizer 114 is employed. Furthermore, as a result of using the homogenizer 114, the peak irradiance incident on the optical fibers of a transmission device 116 (if optical fibers are used) may be reduced below their damage threshold.

Figure 7:
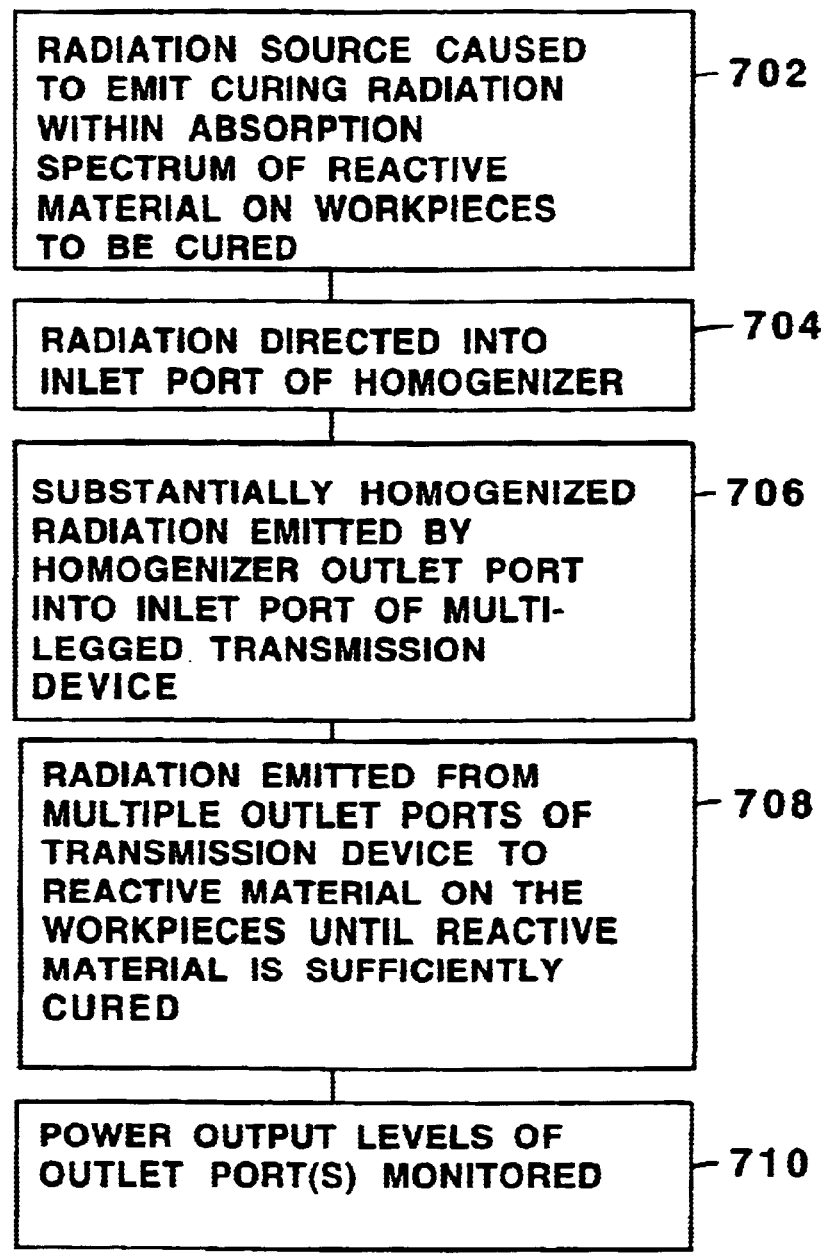
FIG. 7 is a logical flow diagram of a curing method carried out in accordance with the present invention.

FIG. 7 illustrates the steps of the method 700 to cure reactive material at multiple worksites simultaneously using the curing system 100, in accordance with the subject invention. Once the workpieces containing the reactive material have been positioned at the worksites, the user typically first causes the radiation source 110 to generate curing radiation 112 within the absorption spectrum of the reactive material on the workpieces 120 to be cured. (Block 702) The generated radiation is then directed into the inlet port $114^A$ of the homogenizer 114, to substantially homogenize the radiation. (Block 704) The substantially homogenized radiation 126 is then emitted from the homogenizer outlet port $114^B$ into the inlet port(s) $116^A$ of a multi-legged transmission device 116 (Block 706). Radiation 118 is emitted from each transmission device outlet port $116^B$ each (positioned proximate a worksite) to the reactive material on the workpieces 120 until the reactive material is sufficiently cured. (Block 708) As the radiation 118 is emitted, preferably the output power levels of the outlet ports $116^B$ will be monitored by the monitor 124. Alternatively, the radiation emitted from one of the output ports $116^B$ may be monitored directly using a remote monitor (not shown). (Block 710)

As will be understood, while the cross-sectional shapes 230, 330, 430 of the homogenizers' 114', 114", 114'" passageways 216, 316, 416 have been disclosed as being a rectangle, an equilateral triangle, and a regular hexagon, respectively, other cross-sectional shapes including a pentagon may be used, depending on the cross-sectional configuration and dimensions of the inlet port(s) $116^A$ of the transmission device 116.

Thus, while what is shown and described herein constitute preferred embodiments of the subject invention, it should be understood that various changes can be made without departing from the subject invention, the scope of which is defined in the appended claims.

We claim:

1. A curing system for providing curing radiation to multiple worksites simultaneously, the curing system comprising:
   (a) a radiation source adapted to generate curing radiation;
   (b) a homogenizer adapted to receive radiation generated by the radiation source and emit substantially homogenized radiation;
   (c) a radiation transmission device including:
      (i) at least one device inlet port adapted to receive substantially homogenized radiation from the homogenizer;
      (ii) a plurality of transmission channels operatively coupled to the device inlet port and adapted to transmit radiation received by the device inlet port;

(iii) wherein each transmission channel comprises a device outlet port adapted to emit radiation transmitted by the transmission channel.

2. The curing system as claimed in claim 1, wherein each transmission channel comprises a waveguide.

3. The curing system as claimed in claim 1, wherein each transmission channel comprises a liquid light guide.

4. The curing system as claimed in claim 1, wherein each transmission channel comprises fiber optic cabling.

5. The curing system as claimed in claim 1, wherein the homogenizer comprises a bar of material chosen to have a high optical transmission in the desired spectral region.

6. The curing system as claimed in claim 1, wherein the cross-sectional shape of the homogenizer is substantially hexagonal.

7. The curing system as claimed in claim 1, wherein the cross-sectional shape of the homogenizer is substantially triangular.

8. The curing system as claimed in claim 1, wherein the cross-sectional shape of the homogenizer is substantially rectangular.

9. The curing system as claimed in claim 1, wherein the cross-sectional shape of the homogenizer is substantially a polygon.

10. A radiation transmission system for transmitting curing radiation to multiple worksites simultaneously, the transmission system comprising:
  (a) a homogenizer adapted to receive radiation generated by a radiation source and emit substantially homogenized radiation; and
  (b) a radiation transmission device including:
    (i) at least one device inlet port adapted to receive substantially homogenized radiation from the homogenizer; and
    (ii) a plurality of device outlet ports.

11. The radiation transmission system as claimed in claim 10, wherein the transmission device comprises fiber optic cabling.

12. The radiation transmission system as claimed in claim 10, wherein the transmission device comprises a multi-legged liquid light guide.

13. A radiation transmission system as claimed in claim 10, wherein the transmission device comprises a plurality of transmission channels operatively coupled to the device inlet port and adapted to transmit radiation received by the device inlet port and wherein each transmission channel comprises a device outlet port adapted to emit radiation transmitted by the transmission channel.

14. The radiation transmission system as claimed in claim 13, wherein each transmission channel comprises a waveguide.

15. The radiation transmission system as claimed in claim 13, wherein each transmission channel comprises a liquid light guide.

16. The radiation transmission system as claimed in claim 13, wherein each transmission channel comprises fiber optic cabling.

17. The radiation transmission system as claimed in claim 10, wherein the homogenizer comprises a power monitor adapted to detect the power of radiation emitted from the homogenizer.

18. The radiation transmission system as claimed in claim 10, wherein the homogenizer comprises a bar of material chosen to have a high optical transmission in the desired spectral region.

19. The radiation transmission system as claimed in claim 10, wherein the cross-sectional shape of the homogenizer is substantially hexagonal.

20. The radiation transmission system as claimed in claim 10, wherein the cross-sectional shape of the homogenizer is substantially triangular.

21. The radiation transmission system as claimed in claim 10, wherein the cross-sectional shape of the homogenizer is substantially rectangular.

22. The curing system as claimed in claim 10, wherein the cross-sectional shape of the homogenizer is substantially a polygon.

23. A method for curing reactive material at multiple worksites simultaneously, the method comprising the steps of:
  a) generating radiation within the absorption spectrum of the reactive material;
  b) substantially homogenizing the radiation;
  c) directing the substantially homogenized radiation into an inlet port of a multi-legged transmission device;
  d) emitting radiation from a plurality of legs of the transmission device; and
  e) directing the emitted radiation onto the reactive material until the reactive material is sufficiently cured.

24. The method as claimed in claim 23, further comprising the step of positioning each leg of the transmission device proximate a worksite.

25. The method as claimed in claim 23, further comprising the step of positioning reactive material to be cured at a plurality of worksites.

26. The curing system as claimed in claim 1, wherein the homogenizer is substantially tubular.

27. The curing system as claimed in claim 1, wherein the homogenizer comprises reflective interior side walls.

28. The curing system as claimed in claim 10, wherein the homogenizer is substantially tubular.

29. The curing system as claimed in claim 10, wherein the homogenizer comprises reflective interior side walls.

* * * * *